US 6,614,619 B1

(12) United States Patent
Satoh (10) Patent No.: US 6,614,619 B1
(45) Date of Patent: Sep. 2, 2003

(54) CARTRIDGE LIBRARY APPARATUS HAVING AN INNER DOOR TO CLOSE AN OPENING OF THE APPARATUS BODY

(75) Inventor: Tsutomu Satoh, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/504,583

(22) Filed: Feb. 15, 2000

(30) Foreign Application Priority Data

Mar. 18, 1999 (JP) .......................................... 11-074514

(51) Int. Cl.$^7$ ................................................ G11B 15/68
(52) U.S. Cl. ....................................... 360/92; 369/30.48
(58) Field of Search ................................ 360/92, 98.04; 369/30.48

(56) References Cited

U.S. PATENT DOCUMENTS 5,449,229 A * 9/1995 Aschenbrenner et al. ..... 360/92
6,088,189 A * 7/2000 Utsumi et al. ................ 360/92

FOREIGN PATENT DOCUMENTS

| JP | 2-304772 | 12/1990 |
| JP | 3-125369 | 5/1991 |
| JP | 8-180533 | 7/1996 |

* cited by examiner

Primary Examiner—Craig A. Renner
(74) Attorney, Agent, or Firm—Foley & Lardner (57) ABSTRACT

A cartridge library apparatus comprises door 3 provided openably to an opening portion formed in apparatus body B and having a plurality of cells 4 for housing cartridges in its inner surface, inner door 1 provided movably in the apparatus body for opening and closing the opening portion of apparatus body B, and a motion converting mechanism (2, 5, 6 and 11) for driving the opening and closing of the inner door interlocking with opening and closing operations of the door between inner door 1 and door 3. When the door is pivotally moved in an opening direction, the motion converting mechanism causes the inner door to close the opening portion. When door 3 is pivotally moved in a closing direction, inner door 1 is moved to cause the opening portion to be opened.

6 Claims, 9 Drawing Sheets

CARTRIDGE LIBRARY APPARATUS HAVING AN INNER DOOR TO CLOSE AN OPENING OF THE APPARATUS BODY

BACKGROUND OF THE INVENTION

1. Field of the Invention

The present invention relates to a cartridge library apparatus for housing recording media in a plurality of cartridges and selecting a specified cartridge from the cartridges to perform read/write processing of information for the cartridge, and more particularly to a technique for preventing a fall of a cartridge with a simple configuration.

2. Description of the Related Art

The aforementioned cartridge library apparatus has been developed for housing a plurality of removable storage media to facilitate addition and update of stored information in response to a demand for a significant increase in storage capacity associated with improved performance of computers. The apparatus has a housing portion for housing a plurality of removable storage media such as magnetic tape cartridges or optical disk cartridges in which a specified storage medium of the storage media is automatically unloaded and loaded to a read/write portion for processing stored information.

A plurality of cartridges housed in the housing portion are individually designated identification symbols such as predetermined bar codes. When a specific cartridge is to be selected, a hand robot provided in a body of the apparatus is manipulated such that an end of the hand robot irradiates laser light to read an identification symbol with a sensor for selecting the specified cartridge.

Typically, an operator performs loading/unloading of and changeover to a replacement cartridge in such a cartridge library apparatus as required. Such loading/unloading operations of a cartridge by an operator may cause an accidental fall of the cartridge or other foreign matters into the apparatus body. In the apparatus, an accessor mechanism for controlling the hand robot operates at a high speed, and the accessor mechanism may be damaged by such a fallen substance, or a fallen cartridge may be broken. For this reason, various measures have been conventionally taken to prevent such a fall.

Figure 1:
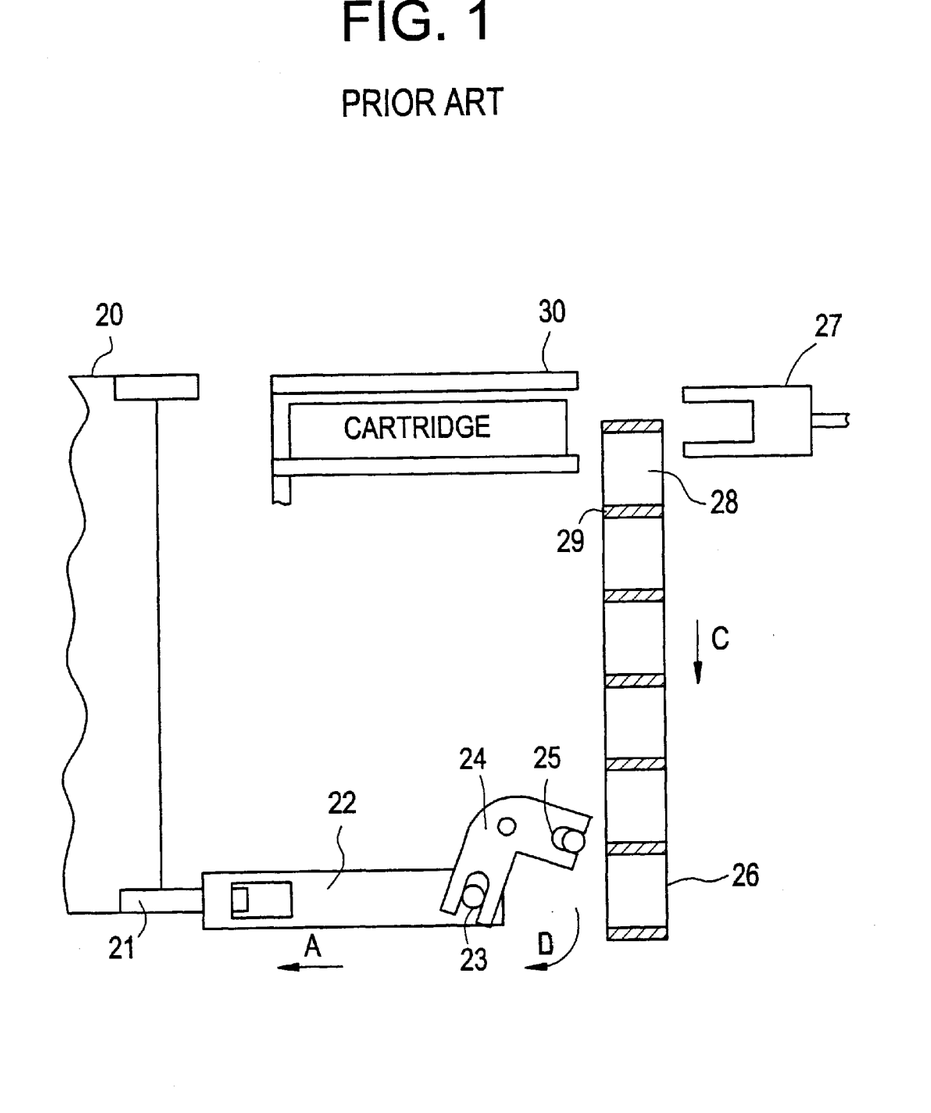
FIG. 1 is a schematic diagram showing a configuration of an example of a prior art.
Figure 2:
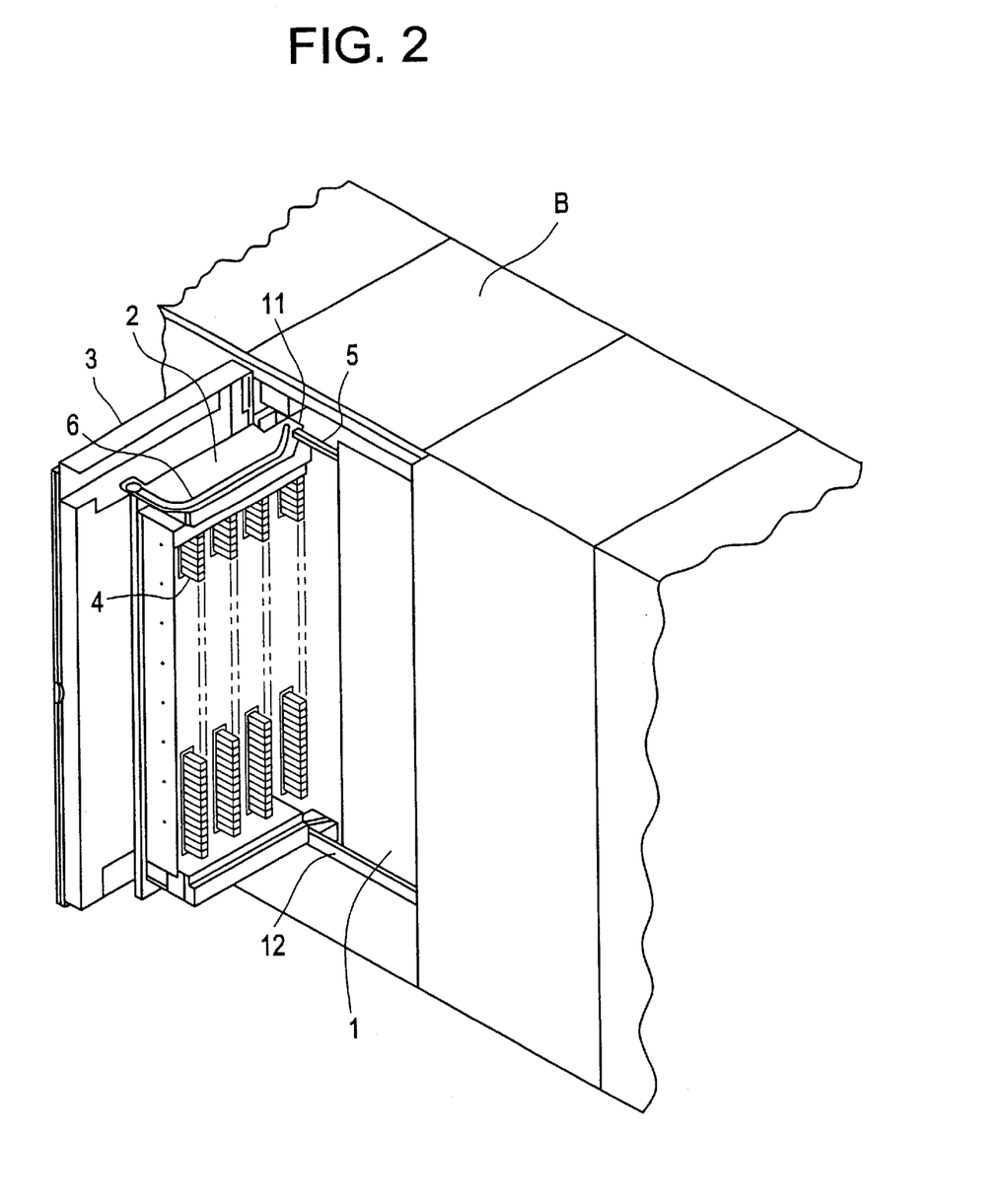
FIG. 2 is a perspective view showing an appearance of main portions in an embodiment of the present invention.

Among them, as an example of a simple configuration which uses no power sources such as motors or actuators, JP-A-03-125369 discloses an assembled type magnetic tape device. This device is provided with an entry door mechanism as shown in FIG. 1. The entry door mechanism has been proposed for the purpose of preventing a fall of a cartridge by hand 27 for moving a cartridge from a stocker portion to a read/write portion being erroneously inserted into stocker portion 30 when an operator opens entry door 20.

Speaking briefly of the configuration and operation, the device is provided with entry shutter 26 which has opening part 28 corresponding to each entry of stocker portion 30 and is movable vertically interlocking with the opening and closing of the entry door between stocker portion 30 for storing a medium and hand 27.

The operation thereof is such that when the device operates and entry door 20 is closed, opening part 28 of entry shutter 26 is at a position corresponding to each entry of stocker portion 30 and hand 27 can freely enter into or exit from each entry of stocker portion 30. When an operator opens entry door 20 for reasons such as replacement of a medium, slide lever 22 is pulled by rocker lever 21 in a direction of arrow A. With this, link lever 24 is turned with lever pin 23 provided on slide lever 22 in a direction of arrow D to move link pin 25 in a direction of arrow C. Since this also causes entry shutter 26 to move in a direction of arrow C, frame 29 for partitioning opening parts 28 of entry shutter 26 moves to a position near a central position of each entry of stocker portion 30, thereby closing stocker portion 30 on the side of hand 27 with entry shutter 26.

The aforementioned prior art, however, has the following problem.

Specifically, since entry shutter 26 consists of opening portion 28 and frame 29 and a gap exists between frame 29 and stocker portion 30, foreign matters such as a hand of an operator may enter into the device from the gap. Hand 27 can be prevented from entering into the stocker portion but it is not possible to reliably prevent other foreign matters from entering into the cartridge library apparatus.

The present invention is made in view of such a problem, and it is an object of the present invention to provide a cartridge library apparatus capable of covering an entire opening portion on the side of an apparatus body interlocking with the opening of a door provided on the apparatus body when the door is opened with a simple mechanism without requiring power such as motors or actuators.

SUMMARY OF THE INVENTION

To achieve the aforementioned object, a cartridge library apparatus according to the present invention comprises a door having a plurality of cells for housing cartridges formed in an inner surface on the side of an apparatus body, and provided openably to an opening portion of the apparatus body, an inner door provided in the apparatus body and movable to close the entire opening portion of the apparatus body, and a motion converting mechanism for driving the opening and closing of the inner door interlocking with opening and closing operations of the door such that the opening portion is closed when the door is open and the opening portion is opened when the door is closed.

The motion converting mechanism includes a cam follower mounted on the inner door on the apparatus body side, and a cam plate mounted on the door side in correspondence with the cam follower and having a cam groove movably engaged with the cam follower.

The cam follower is rotatably mounted on the inner door.

The cam groove is formed to run from the central axis side of pivotal movement to the end side of the pivotal movement of the door and to run along the path of the pivotal movement of the door near the end side of the pivotal movement of the door.

The aforementioned cam groove near the end side of the pivotal movement of the door is formed to run along the path of the pivotal movement of the door and is set to have a length greater than the periphery of the mounting height of the cartridges.

A plurality of rollers having a rotating axis along a horizontal direction are provided in a top portion of the inner door, each of the rollers has a substantially U-shaped groove formed on its periphery, and each of the rollers is disposed on a guide rail provided within the apparatus body through the U-shaped groove, whereby the inner door is movably mounted on the apparatus body.

Additionally, a plurality of side rollers having a rotating axis along a vertical direction are provided in a bottom portion of the inner door, each of the side rollers is engaged with a substantially U-shaped side rail provided within the apparatus body, whereby the movement of the inner door in a direction orthogonal to the plane thereof is suppressed.

With the aforementioned configuration, the cartridge library apparatus according to the present invention produces the following favorable effects.

First, when the cartridge housing door is opened, the inner door is moved interlocking with the angle of opening/closing of the cartridge housing door to cover the interior of the cartridge library apparatus. Thus, when an operator opens and closes the cartridge housing door for adding or replacing a cartridge in the cartridge library apparatus, it is possible to prevent a cartridge, tools, or other foreign matters such as a hand of the operator from entering into the cartridge library apparatus to ensure safety of the cartridge apparatus and the operator.

Additionally, a simple mechanism in which the inner door is moved along the path of the cam plate mounted on the cartridge housing door when the cartridge housing door is opened and closed eliminates the need for using power such as motors or actuators and sensors, thereby allowing a reduction in the number of components and a reduction in cost.

The above and other objects, features and advantages of the present invention will become apparent from the following description referring to the accompanying drawings which illustrate an example of the preferred embodiment of the present invention.

DETAILED DESCRIPTION OF THE PREFERRED EMBODIMENT

Next, an embodiment of the present invention will be described with reference to FIG. 2 to FIG. 9.

In the drawings, reference symbol B shows an apparatus body constituting a cartridge library apparatus in the embodiment.

The cartridge library apparatus comprises cartridge housing door 3 having cells 4 mounted for housing a plurality of cartridges, inner door 1 for covering the interior of the cartridge library apparatus interlocking with the opening and closing of cartridge housing door 3 to prevent a cartridge or other foreign matters from entering into the apparatus for ensuring safety of cartridges and operators, and cam plate 2 mounted on cartridge housing door 3 as a guide along a path associated with angles formed when cartridge housing door 3 is opened and closed.

Figure 7:
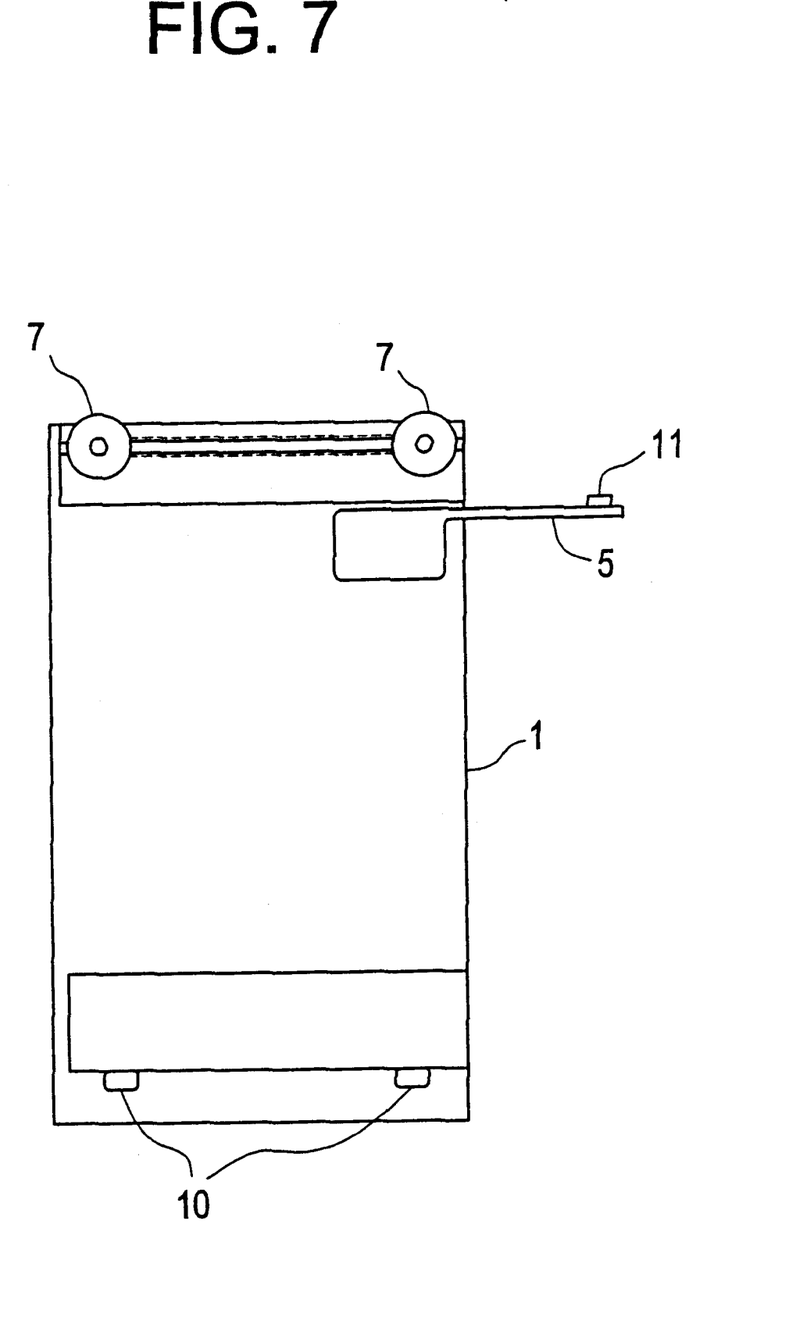
FIG. 7 is a front view showing inner door 2.
Figure 8:
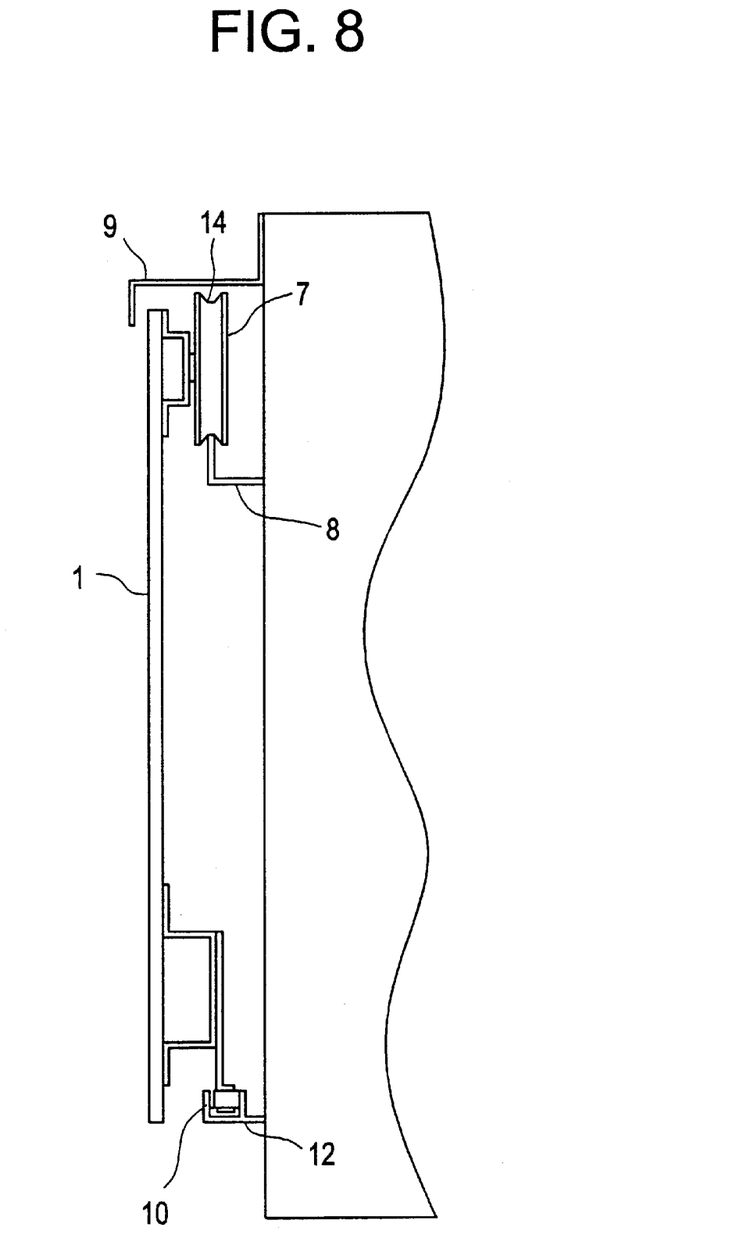
FIG. 8 is a side view showing mounted inner door 2.

FIG. 7 and FIG. 8 are schematic diagrams of inner door 1 in the embodiment according to the present invention.

In FIG. 7, inner door 1 comprises at least two side rollers 7 for receiving the weight of inner door 1, at least two side rollers 10 for regulating the depth direction of inner door 1, link 5 for linking inner door 1 and cam 2, cam follower 11 attached to link 5 and freely movable without a load on cam groove 6 of cam plate 2 and having a flange for preventing detachment from cam groove 6 of cam plate 2, rail 8 for supporting the weight of inner door 1 and guiding the movement of inner door 1, cover 9 serving as a detachment stop for preventing detachment of inner door 1 from rail 8, and side rail 12 having a U-shaped (box shape with one side opened) as a guide in the depth direction at the movement of inner door 1. Cam follower 11 freely movable without a load on cam groove 6 can be achieved by rotatably mounting it on link 5.

Additionally, in the embodiment, the aforementioned cam plate 2, link 5, cam groove 6, and cam follower 11 constitute a motion converting mechanism for converting the rotating motion of cartridge housing door 3 into the opening/closing motion of inner door 1.

Next, the operation of the embodiment will be described.

Figure 3:
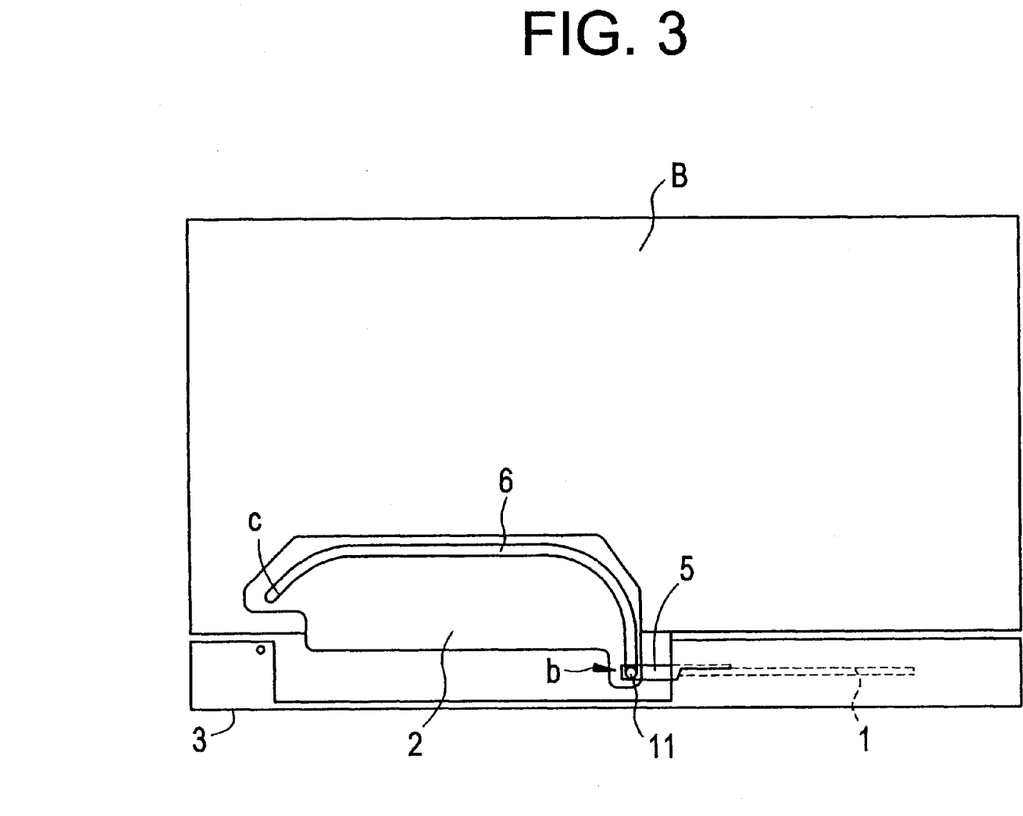
FIG. 3 is a plan view showing the embodiment in FIG. 2.
Figure 4:
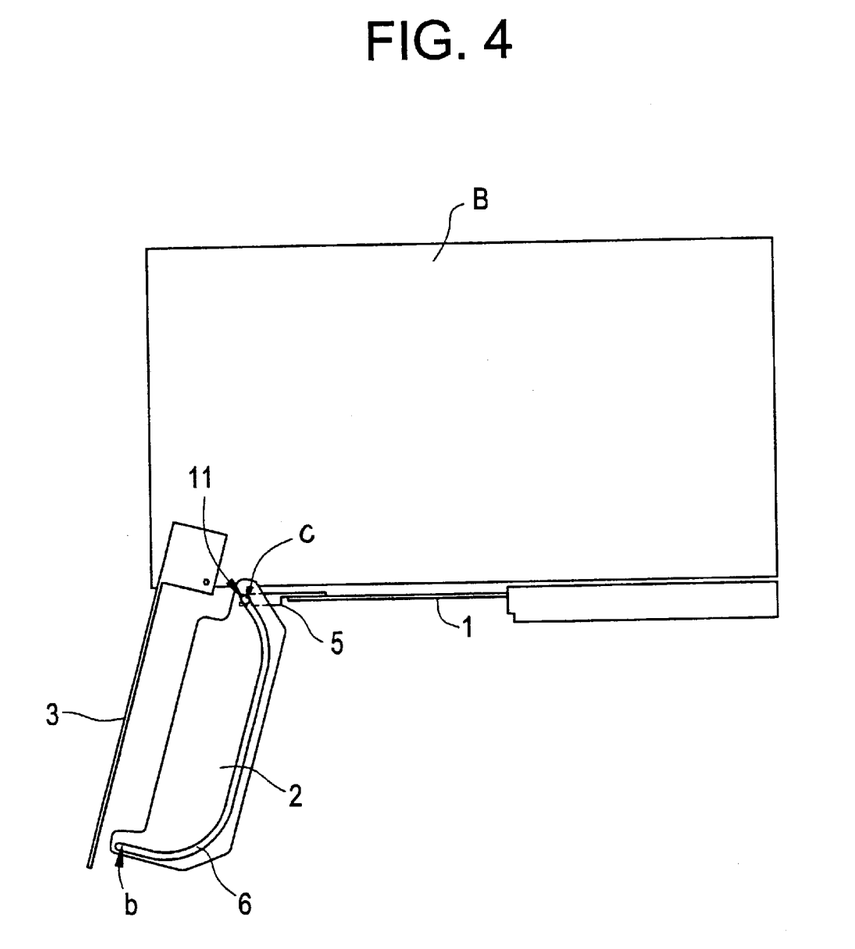
FIG. 4 is a plan view showing door 1 fully opened.
Figure 5:
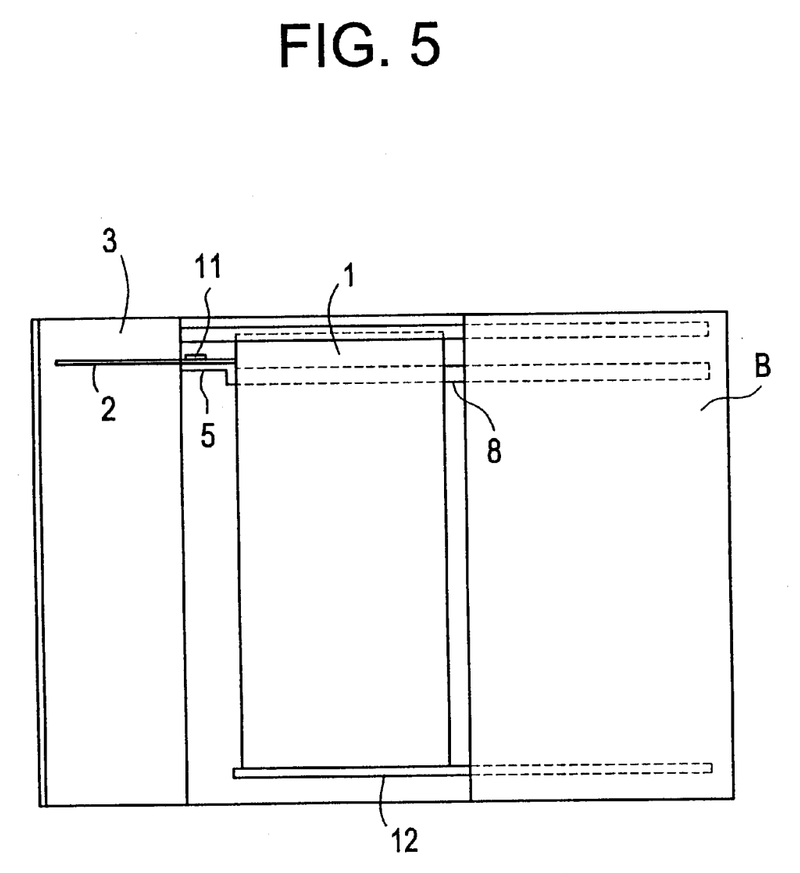
FIG. 5 is a front view showing the embodiment in FIG. 2.
Figure 6:
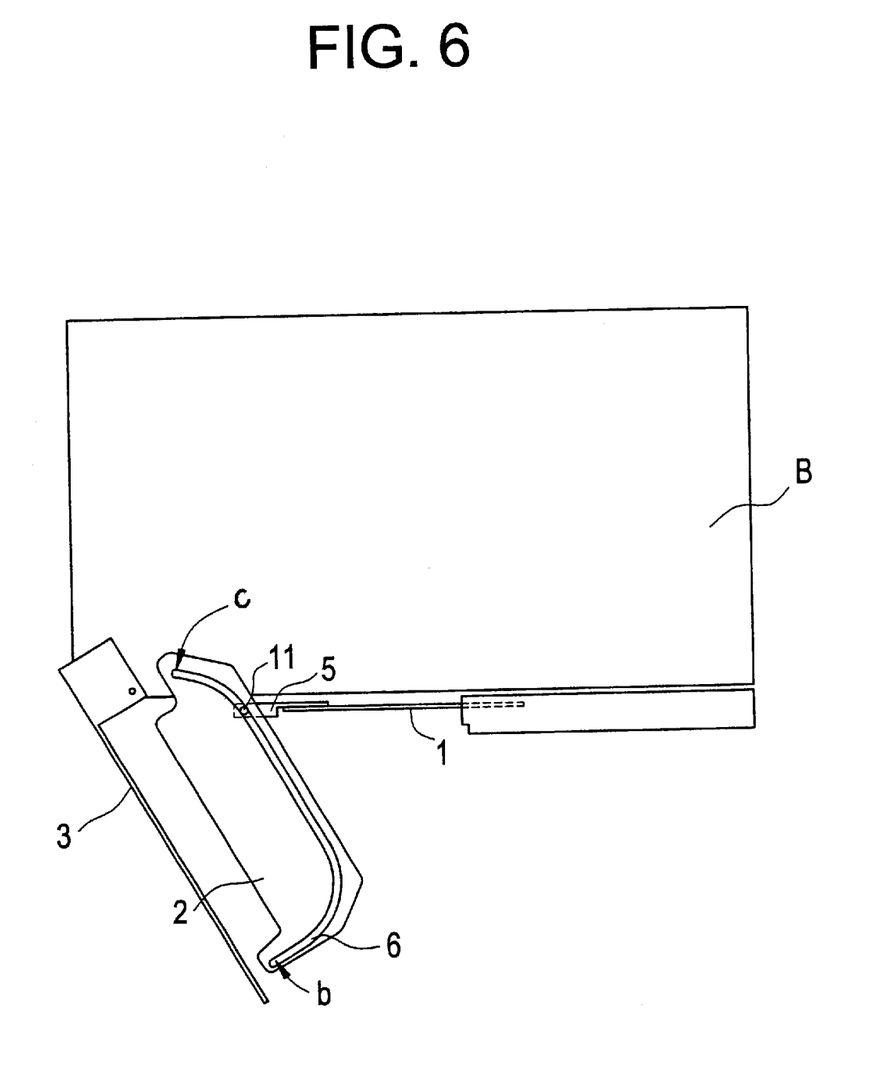
FIG. 6 is a plan view showing door 1 partway opened.

When an operator opens cartridge housing door 3 for reasons such as loading of a cartridge into the cartridge library apparatus, cam plate 2 mounted on cartridge housing door 3 is pivotally moved at the same angle as the rotating angle of cartridge housing door 3 (see FIG. 6), and cam follower 11 mounted on link 5 moves from b position to c position along the path of cam groove 6 provided in cam plate 2 (see FIG. 3 and FIG. 4).

With the motion of cam follower 11, link 5 on which cam follower 11 is mounted and inner door 1 to which link 5 is attached move in apparatus body B interlocking with the movement of the position of cam follower 11. Instead of cartridge housing door 3 which has covered an opening portion of apparatus body B, inner door 1 covers the opening portion (see FIG. 4 and FIG. 5). As a result, it is possible to prevent a cartridge or foreign matters such as a hand of an operator from entering into apparatus body B to ensure safety of the apparatus and the operator.

Next, description is made for a case where an operator closes cartridge housing door 3.

When an operator closes cartridge housing door 3, cam plate 2 mounted on cartridge housing door 3 is pivotally moved at the same angle as the rotating angle of cartridge housing door 3, and cam follower 11 mounted on link 5 moves from c position to b position along the path of cam groove 6 in cam plate 2. Link 5 on which cam follower 11 is mounted and inner door 1 to which link 5 is attached move interlocking with the position of cam follower 11. With this movement, the opening portion of apparatus body B is opened. Upon opening of the opening portion of apparatus body B, a hand robot (not shown) is allowed to be manipulated to move a cartridge housed in cartridge housing door 3 between cell 4 and a read/write portion in the apparatus.

In the embodiment, as shown in FIG. 8, by forming roller cam groove 14 of roller 7 mounted on inner door 1 in V-shaped or U-shaped with respect to a plane in contact with rail 8, it is possible to regulate the depth direction and it can be realized without using a U-shaped (box shape with one side opened) rail, thereby making it possible to provide a simpler shape of the rail.

Figure 9:
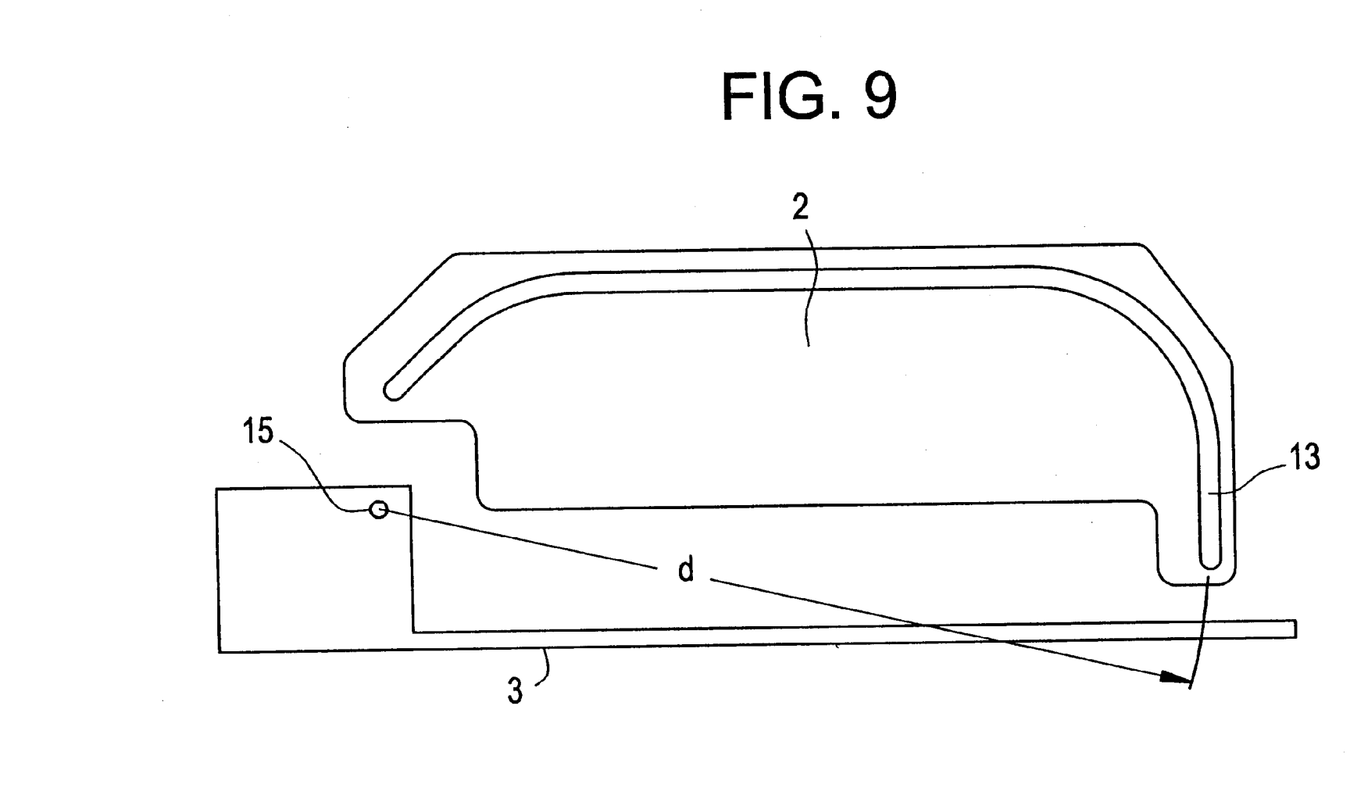
FIG. 9 is a plan view for explaining a shape of a cam groove.

Additionally, the plane shape of cam groove 13 provided in cam plate 2 is set such that, as shown in FIG. 9, it forms a path having a length slightly greater than a mounting height of cartridges from, as a starting point, a position at a radius of d of door supporting point 15 which is the center of pivotal movement of cartridge housing door 3 when cam follower 11 is at position b in cam plate 2.

With this setting, it can have the length such that when the cartridge housing door is opened, inner door 1 waits until cells 4 mounted on cartridge housing door 3 pass through the operational area of inner door 1 and inner door 1 begins moving after cells 4 of cartridge housing door 3 pass to prevent cells 4 mounted on cartridge housing door 3 and inner door 1 from interfering with each other.

It is to be understood that variations and modifications of the cartridge library apparatus disclosed herein will be evident to those skilled in the art. It is intended that all such modifications and variations be included within the scope of the appended claims.

What is claimed is:

1. A cartridge library apparatus comprising:
    a first door having a plurality of cells for housing a plurality of cartridges formed in an inner surface on the side of an apparatus body, and provided openably to an opening portion of said apparatus body;
    an inner door provided in said apparatus body and movable to close the entire opening portion of said apparatus body; and
    a motion converting mechanism for driving the opening and closing of said inner door interlocking with the opening and closing operations of said first door such that said opening portion is closed when said first door is open and said opening portion is opened when said first door is closed,
    wherein said motion converting mechanism includes a cam follower mounted on said inner door, and a cam plate mounted on said first door and having a cam groove movably engaged with said cam follower.

2. The cartridge library apparatus according to claim 1, wherein said cam follower is rotatably mounted on said inner door.

3. The cartridge library apparatus according to claim 1, wherein the cam groove has a shape such that it runs from the central axis side of pivotal movement to the end side of the pivotable movement of said first door and such that it runs along a path of the pivotal movement of said first door near the end side of the pivotable movement of said first door.

4. The cartridge library apparatus according to claim 3, wherein the cam groove near the end side of the pivotal movement of said first door is formed to run along the path of the pivotal movement of said first door and is set to have a length greater than at least the mounting height of the cartridges.

5. A cartridge library apparatus comprising:
    a first door having a plurality of cells for housing a plurality of cartridges formed in an inner surface on the side of an apparatus body, and provided openably to an opening portion of said apparatus body;
    an inner door provided in said apparatus body and movable to close the entire opening portion of said apparatus body;
    a motion converting mechanism for driving the opening and closing of said inner door interlocking with the opening and closing operations of said first door such that said opening portion is closed when said first door is open and said opening portion is opened when said first door is closed; and
    a plurality of rollers having a rotating axis along a horizontal direction and provided in a top portion of said inner door, each of said rollers having a substantially U-shaped groove formed in its periphery, each of said rollers disposed on a guide rail provided within said apparatus body through the groove, whereby said inner door is movably mounted on said apparatus body.

6. A cartridge library apparatus comprising:
    a first door having a plurality of cells for housing a plurality of cartridges formed in an inner surface on the side of an apparatus body, and provided openably to an opening portion of said apparatus body;
    an inner door provided in said apparatus body and movable to close the entire opening portion of said apparatus body;
    a motion converting mechanism for driving the opening and closing of said inner door interlocking with the opening and closing operations of said first door such that said opening portion is closed when said first door is open and said opening portion is opened when said first door is closed; and
    a plurality of side rollers having a rotating axis along a vertical direction and provided in a bottom portion of said inner door, each of said side rollers engaged with a substantially U-shaped side rail provided within said apparatus body, whereby the movement of said inner door in a direction orthogonal to the plane of said inner door is suppressed.

* * * * *